Figure 1:
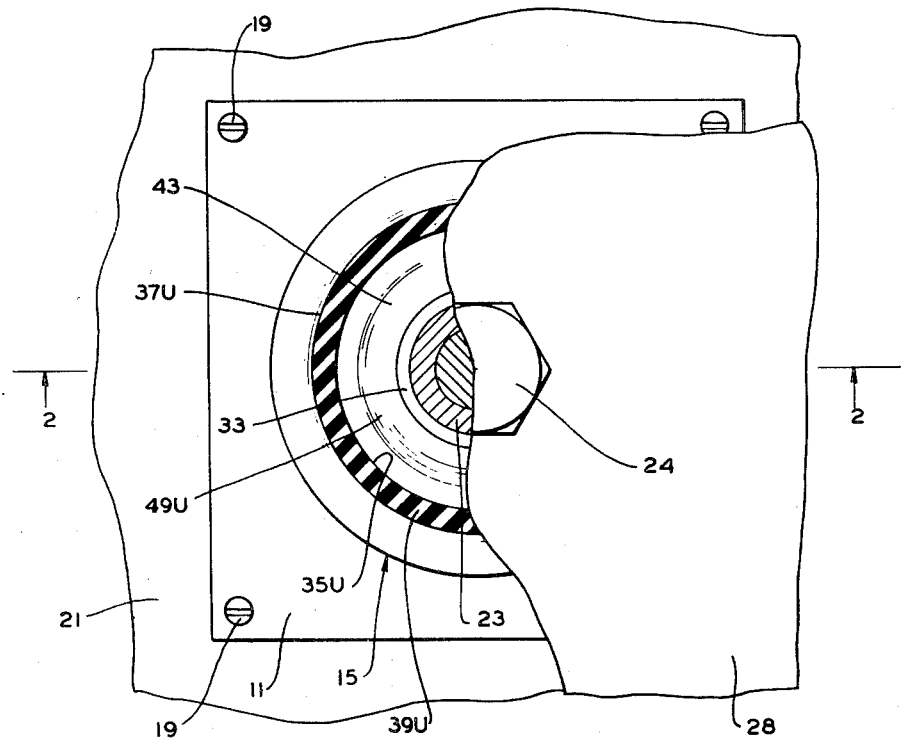

Jan. 22, 1952  N. E. LEE  2,582,998

FLUID DAMPED RESILIENT MOUNTING

Filed July 7, 1945

INVENTOR.
NORMAN E. LEE
BY
*William D. Lee*
ATTORNEY

Patented Jan. 22, 1952

2,582,998

UNITED STATES PATENT OFFICE 2,582,998

FLUID DAMPED RESILIENT MOUNTING

Norman E. Lee, Forest Hills, N. Y.

Application July 7, 1945, Serial No. 603,735

6 Claims. (Cl. 248—358)

(Granted under the act of March 3, 1883, as
amended April 30, 1928; 370 O. G. 757)

The invention described herein may be manufactured and used by or for the Government for governmental purposes, without the payment to me of any royalty thereon.

The present invention relates to improvements in mountings and more particularly to improvements in mounting means of the type used to sustain a load relative to a base, so as to prevent, or at least minimize, the transmission of vibrations, shocks and noises from said load to said base, and vice versa.

Some installations require mounts which will protect against a number of different kinds of impulses. For instance, in aircraft sensitive apparatus must be shielded from forced vibrations of the engines and associated parts, at various speeds, including that speed at which there are generated vibrations of the resonant frequency of the mounted equipment, and also from shocks occurring in rough air and when landing.

In marine installations, provision must be made not only against vibrations set up by the engines, shafts and propellers, which operate at variable speeds, usually of lower frequencies than in aircraft, but also against deflections caused by pitching and rolling of the vessel.

In vehicular installations the problem is more complicated as the supports must provide protection against forced vibrations of the engines and associated parts, operating at variable speeds, including the natural vibrating frequencies, vibrations due to substantially uniform, minor irregularities of the road beds traversed by the vehicles, which usually have abrupt wave-forms, and shocks due to holes and abnormal irregularities in the road surfaces. These conditions are greatly exaggerated in the case of military vehicles which often must cover terrain far rougher than that covered by other vehicles and which may also be subjected to ballistic impacts and concussions.

Vibration and shock mounts of the prior art, although used in tremendous quantities, have been found to be badly defective in performing their intended purposes.

Some mounts are capable of curtailing the transfer of vibrations of relatively high frequency, but are unsatisfactory because they allow vibrations at the resonant or natural frequency of the supported load to be so greatly amplified as to be seriously detrimental.

Some operate to attenuate deflections in only one direction of movement, such as vertical, and are therefore unsuited to installations requiring attenuation in several directions.

Some are equipped with snubbers which come into play abruptly when the deflections reach a certain amplitude and, as a result, they set up violent counterforces and regularly recurrent shocks which are often more destructive to sensitive apparatus than the vibrations and shocks which the mounts are intended to absorb.

Again, some mounts are so designed that, if the spring material (such as rubber) is injured, as by tearing, or there is a separation of a bond between the spring material and the metal, the mounted equipment may separate entirely from the base and be severely damaged.

Some supports, having hydraulic systems comprising a cylinder and a piston operating therein, have excellent vibration damping characteristics but are relatively large in size and are expensive to manufacture and maintain, and they also are subject to leakage of the hydraulic medium therefrom. In addition, they are generally good in only one direction and they require a spring system separate from the hydraulic system.

Some mounts put a tensile loading on the spring material, which results in greater drift and greater sensitivity to injury than other types of loading.

In some mounts, oscillations persist and add to later oscillations so as to amplify rather than reduce them.

It is intended by the present invention to provide shock and vibration supports which are not attended by defects of earlier mounts.

It is an object of the present invention to provide means of supporting equipment which will satisfactorily isolate and absorb vibrations and shocks of various frequencies.

It is also an object to provide a mount which may be stiff enough so as not to unduly amplify low frequency and resonant frequency oscillations, but still soft enough to attenuate high frequency oscillations and thrusts of great force, without giving rise to countershocks.

It is another object to provide a mount which incorporates both a shock absorbing system and a spring system in a single unit.

It is still another object to provide supports wherein the action of the spring system facilitates the operation of the absorbing system.

It is a still further object to provide such mounts wherein natural rubber or a similar material may be used as the spring system and wherein deformations of said material are utilized to accelerate the functioning of the shock absorption system.

It is a further object to provide supporting means which will cushion displacements in different directions, such as vertical, horizontal and rotational.

Another object is to employ hydraulic damping in mounting devices which are so designed that they will not suffer from leakage of the hydraulic medium, which will be small in size relative to earlier hydraulic mounts, which will not incorporate solid, nonresilient parts moving against each other with resultant wear, changes in operating characteristics and replacement of parts.

It is still another object to provide mounts in which the hydraulic medium is confined in extensible chambers which provide the necessary volumetric capacity for the medium under different conditions of operation.

Still another object is to provide mounts having external dimensions which allow them to be substituted for presently manufactured mounts without necessitating structural changes in either the base or the load.

A still further object is to provide mounts designed to absorb and attenuate shocks in most directions to such a degree as to eliminate the need of snubbers and thereby avoid the violent countershocks frequently caused thereby.

It is still another object to provide mounts wherein metal to metal contacts are eliminated and hence the transfer of sound, as well as vibration and shock, is inhibited.

It is also an object to provide a mount which, despite unusual vibrations and shocks, and wear and tear, will not allow the equipment sustained thereby to tear loose entirely from the base.

It is yet another object to provide a mounting wherein the resilient material is subjected to a correcting tension to minimize the possibility of drift due to repeated compression or flexure.

It is another object to eliminate tensile loading of the spring material and the disadvantages resulting therefrom.

It is still another object to provide simple auxiliary means for changing the operating characteristics of a mount.

It is another object to provide means whereby the load range of a particular mount may be greatly increased.

The foregoing objects and others which will become clear from the following specification are accomplished by mounts of the type illustrated in the drawings.

In general, the preferred embodiment illustrated in the drawings comprises a spool-like member made up of a core and two parallel load plates secured to it. Disposed about the core and intermediate the load plates is a washer-like base plate provided with a central opening. Interposed between the load plates and encircling the core and secured to the marginal edge of the said opening is an annular member of elastic material which includes two tubular spring elements disposed respectively above and below the base plate. Each of said spring elements is so shaped that, under normal vibrations, it acts as a column in compression but, when subjected to shocks of greater force, it buckles or collapses so as to act in flexure and, hence, is considerably softer than when in compression. In other words, the length and width of the material of each of said spring elements are so related to each other and also to the particular elastic material used that, up to a certain predetermined amount of force, it acts as a "column," that is it acts primarily in compression and is stable so that it does not buckle, but, when subjected to a greater amount of force, it does not act as a "column" but it buckles or collapses into flexure. The annular member incorporates two hydraulic chambers, respectively above and below the base plate, which chambers are connected through a throttling orifice means made up of permeable material. Said chambers are filled with a suitable hydraulic fluid. Movements of the base plate relative to the load plates will cause a flow of said hydraulic medium to and fro between said chambers and through said throttling orifice means, so as to act as a shock absorbing system. Said mount may be provided with auxiliary tubular spring elements which may be positioned about the spring elements so as to stiffen the latter, and increase their width to length ratio, and adapt the mounts to greater loads.

The base plate and the load spool may be secured, respectively, to a base and a load (or vice versa), which are to be insulated from each other.

Figure 2:
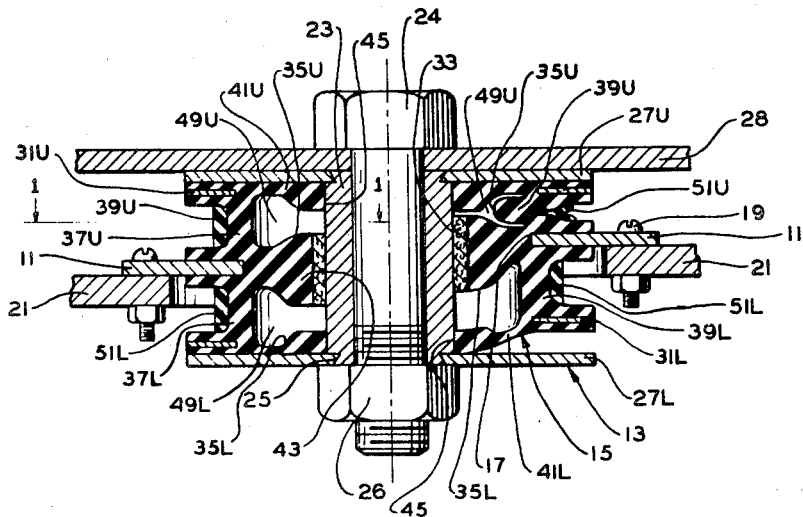

In the accompanying drawings (which for clarity do not show the hydraulic medium), Figure 1 is a plan view, partly horizontally sectioned along the line 1—1 of Figure 2, of a mounting embodying the present invention, shown in its, at rest, condition; and Figure 2 is a composite vertical sectional view of the mounting of Figure 1, taken along the line 2—2 of Figure 1, said mounting being shown, at the left, in its normal, at rest, condition, and at the right, in its condition when the base plate is deflected upwardly almost to its position of maximum deflection (auxiliary spring elements being shown, to indicate how they operate when installed).

Referring now to the figures, the form of mounting embodying the present invention, there shown, comprises, as its main structural elements, a base plate 11, a load spool 13 and an elastic member 15. The base plate 11 is a horizontally disposed, flat, washer-like plate of metal, of square peripheral configuration, and pierced by a central circular opening 17. Said base plate 11 is also provided at its corners with holes adapted to receive bolts 19 by which the mounting may be secured to a base 21.

The load spool 13 has a central, vertically positioned, tubular metal core 23 which is provided with a circumferential rabbet 25 at each end. Fitted into each of said rabbets 25 is a flat circular, washer-like, horizontally disposed, metal load plate 27U and 27L, the ends of the core 23 being swaged over so as to make said load plates 27U, 27L integral with said core 23. The core 23 is provided with a bolt 24 and nut 26 by means of which a load 28 may be fastened to the load spool 13.

The elastic member 15 is made composite with two flat circular metal washers 31U, 31L and a throttling slide 33 and it is also secured to the base plate 11 and to the core 23, as will now be described. The elastic member 15 itself is a generally annular piece of elastic material, such as natural or synthetic rubber, which encircles the core 23, as noted above, and is disposed between the load plates 27U, 27L, aforesaid. Said elastic member 15 is provided with upper and lower, undercut, interior grooves 35U, 35L, and upper and lower exterior channels 37U, 37L. Thus, it is seen that said elastic member 15 is made up of upper and lower, tubular spring elements 39U, 39L and three inwardly extending, annular flanges and three outwardly extending, annular flanges.

Each of the spring elements 39U, 39L is so shaped, and its width to length ratio is such, that, upon slight vertical thrusts, it will go into compression and act as a column, but, under greater thrusts, it will become unstable and will buckle inwardly and go into flexure. The upper and lower, inwardly extending flanges form upper and lower webs 41U, 41L, the inner surfaces 45 of which are secured to the core 23 as by a rubber to metal bond. The intermediate, inwardly extending, flange forms an annular spring collar 43, to the inner surface of which is secured the tubular throttling slide 33, which is made of a permeable resilient material, such as felt or fine sponge rubber, and which makes a snug sliding fit about the core 23. The upper and lower outwardly extending flanges have embedded therein the upper and lower, flat, horizontally disposed, metal washers 31U, 31L. The intermediate, outwardly extending flange has embedded therein the inner marginal edge portion of the washer-like base plate 11, which is secured thereto, as by a metal to rubber bond.

It will now be seen that the interior grooves 35U, 35L, in conjunction with the exterior surface of the core 23, form, respectively, upper and lower, completely enclosed, annular, hydraulic chambers 49U, 49L, which may be filled with any suitable hydraulic medium (not shown), either a liquid, or a gas, or a combination of both.

The mount just described may be supplied with one or more pairs of upper and lower auxiliary spring elements 51U, 51L, which are no more than tubular bands of elastic material, similar to heavy rubber bands, which are of a size to slip into the channels 37U, 37L and completely encircle the upper and lower spring elements 39U, 39L. Said auxiliary spring elements 51U, 51L may be provided in different thicknesses, or they may all be the same thickness and one or more may be used, to achieve different operating characteristics, as hereinafter described.

In the use of the mounting just described, the base plate 11 and the load spool 13 are secured, by means of the bolts 19 and the bolt 24, respectively, to a base 21 and a load 28, which it is desired to vibrationally isolate from each other. However, said parts may be joined in the opposite order, that is, the base plate 11 may be fastened to a load 28 and the load spool 13 to a base 21.

To describe the operation of the present mounting, it will be assumed that the base 21 is part of the chassis of a motor vehicle, and that the load 28 is a radio set. As normal vertical vibrations of the motor vehicle occur, the base plate 11 is caused to oscillate vertically, thus putting the tubular spring elements 39U, 39L alternately under vertical compression. At the same time the relative volumetric capacities of the chambers 49U, 49L are changed slightly, alternately, so as to cause an alternate change in relative pressures, and thereby to force a slight flow of the hydraulic medium to and fro through the tiny pores of the permeable throttling slide 33.

However, when a shock of considerable force occurs, such as might result when the vehicle runs over a high bump in a road, the base plate 11 is deflected upwardly with such force and suddenness that the upper spring element 39U is caused to collapse inwardly into a state of flexure, wherein it is much softer vertically than when under compression, as mentioned above. The point at which such collapse occurs depends upon the particular material used in the spring element and in its width to length ratio. The condition of the present mounting under such an upward thrust is illustrated in the right half of Figure 2 (almost the maximum possible amplitude of deflection being shown), where the inward buckling of the upper spring element 39U is clearly shown. It is to be particularly noted that the upper chamber 49U is so shaped that the said flexed upper spring element 39U occupies said chamber almost completely. Simultaneously, the lower hydraulic chamber 49L is increased in size as the spring collar 43 is moved upwardly (shown in the right side of Figure 2) and the inner rim of the web 41L is held down by being bonded to the core 23.

Thus, it is seen that, with a relatively short longitudinal movement of the base plate 11, the relative change in the volumetric capacities of the two hydraulic chambers 49U, 49L, accomplished by the deformation of the resilient material, is tremendous.

When such a shock as aforementioned occurs, the hydraulic medium in the upper chamber 49U is forced rapidly through the throttling slide 33 into the lower chamber 49L. The energy resulting from the shock is increasingly stored up in the flexing upper spring element 39U and the amplitude of deflection within the mount is limited thereby and also by the energy dissipation resulting from forcing the hydraulic medium from the upper chamber 49U to the lower chamber 49L through the throttling slide 33. The rebound oscillations from said shock are then rapidly damped out by the hydraulic system.

It will be seen, as shown to the right in Figure 2, that, when the base plate 11 is deflected upwardly the outer peripheral portion of the lower web 41L is caused to move upwardly from its normal position in abutment with the peripheral portion of the lower load plate 27L, thereby avoiding excessive tension upon the lower tubular spring element 39L, which might result in drift therein. The same is also true in respect to the upper spring element 39U. On the other hand, drift in said spring elements 39U, 39L, which might be caused by repeated compression and flexure thereof is minimized, and probably eliminated, by the fact that, after each compressive and/or flexible strain of one of said spring elements 39U, 39L, it is subjected to a limited tension by one of the webs 41U, 41L, as shown in the lower right of Figure 2. Thus, it is seen that the geometry of the elastic member 15 of the present mount is such as to give it a much longer useful life than the spring means of conventional mounts.

Although the present mount is intended for installations where the more significant vibrations and shocks anticipated will be in a longitudinal direction relative to the position in which the mount is installed, said mount is also able to accept and attenuate vibrations and shocks in a lateral direction. Thus, it will be seen that the resilient materials of the annular spring collar 43 and the throttling slide 33 have sufficient compliance to allow the base plate 11 enough lateral movement relative to the load spool 13 to provide for any anticipated movements in that direction.

Should there be any twisting or rocking movements imparted to the base plate 11, the mount described has sufficient rotational compliance to allow such movements and sufficient attenuating qualities to isolate them from the load 28. When the base plate 11 is subjected to normal rotational movements, about an axis parallel to said base plate, of relatively slight force, the upper spring element 39U is compressed to one side of the core 23 and is pulled away from the upper load plate to the diametrically opposite side of the said core, while the lower spring element 39L is affected in the same manner but on the reverse sides of the core. Should there be a rotational movement of greater force the result will be similar, except that collapse and flexure of diametrically oppositely disposed portions of the upper and lower spring elements 39U, 39L (rather than mere compression) will take place. Thus, it is seen that rotational oscillations will be attenuated in much the same way as vertical oscillations viz., by a relatively stiff spring action (compression) under slight thrusts and relatively soft action (flexure) under greater thrusts.

It will be understood that, although the amplitude of the mount just described is limited toward the ends of vertical strokes, the mount gets progressively stiffer as it approaches a maximum deflection and thus stops movements gently, without any abrupt jolts, as occur in mounts utilizing bumpers.

The spring elements 39U, 39L of a particular mount embodying the present invention may, in effect, be stiffened and increased in width to length ratio, either to allow the mount to take greater loads, or to cause the mount to collapse and go into flexure only under greater thrusts than those for which said particular mount was originally designed. This is accomplished by the use of the auxiliary spring elements 51U, 51L, mentioned above, which may readily be snapped into place in the channels 37U, 37L respectively. When so installed there is a virtual lateral thickening of the spring elements 39U, 39L of the mount. One set of such auxiliary spring elements 51U, 51L is shown (see Figure 2), in position in the preferred form of the mount. Several pairs of thin auxiliary spring elements 51U, 51L would have the same effect, in changing the operating characteristics of a mount, as one pair of thick auxiliary elements.

It is notable that, by the artifice of supplying several pairs of auxiliary spring elements 51U, 51L with a particular mount, its load-deflection characteristics may be so varied and its load range may be so increased as to reduce the number of different mounts which must otherwise be manufactured for various installations. Thus, a mount may be fabricated with relatively light spring elements 39U, 39L so as to take relatively light loads, but the same mount may be stiffened to take heavier loads in several load ranges by providing it with several sets of such auxiliary spring elements 51U, 51L.

The steady energy absorption by the hydraulic system, of the mount described above, combined with the increasing recovery force stored up in the spring system as the amplitude of deflection increases, results in a time lag in the deflection, thereby keeping the amplitude of deflection within the predetermined limits of a particular mount. Thus, by a steadily increasing storage and absorption of energy, the vibrations and shocks are attenuated without the use of snubbers, which may act with an injurious abruptness.

An important feature of the present invention is that axial deflections of small amplitude cause relatively large changes in the shapes and sizes of the hydraulic chambers 49U, 49L. These relatively large changes are particularly advantageous where a hydraulic medium of low viscosity is used as it results in more rapid movements of the medium about and between said chambers 49U, 49L and, hence, a greater absorption of energy. Low viscosity liquids may sometimes be preferred because they may be more satisfactory over greater temperature ranges. It will be understood that the hydraulic medium may be either gaseous, or liquid, or a combination of both. In some installations such combination would be helpful so as to allow volumetric changes within the hydraulic chambers 49U, 49L without undue deforming strain on the material of the elastic member 15. A compressible medium also helps to compensate for pressure changes due to temperature variations.

To appreciate the superiority of mounts embodying the present invention, some study of load-deflection curves is profitable. Many commercial mounts today have a substantially linear load-deflection curve; that is, deflection and load increase at about a constant ratio except that, toward the end of the curve, the load increases more rapidly than the deflection. Thus, a load-deflection curve for such a mount is a fairly straight slanting line which swings upward steeply toward the end.

Mounts embodying the present invention, on the other hand, as already explained, are relatively stiff at first, then get softer, and finally get stiff again. Thus, a load-deflection curve for such mounts is initially quite steep and then proceeds at a lesser slope and finally swings upward again to the end of the curve.

It should be understood that a shock mount which has the best load-deflection curve is one which, for a given displacement and energy absorption, will transmit the smallest forces.

One of the members to which a shock mount is fastened, such as the chassis of a motor vehicle in the example mentioned above, has a certain kinetic energy due to its movement. This energy must be accepted ideally by the shock mount. The energy is translated in the shock mount to the potential energy involved in straining the resilient material. The potential or strain energy is the work done in deforming the mount and it is equal to the area under the portion of the load-deflection curve traversed. The greater the thrust to which a mount is subjected and, hence, the greater the attendant kinetic energy, the larger the area under the curve.

Thus, it is seen that a mount is most satisfactory when its deflection curve is such that, for a given deflection, the area under the curve is at a maximum. It is obvious that a load-deflection curve, which is initially steep and then proceeds at a lesser slope (as in the present mount), will provide more area under it and, hence, more energy absorption than a deflection curve which is relatively linear (as is typical of present commercial shock mount practice, as mentioned above).

For thrusts having relatively large energy, it will be understood that, to absorb said energy, a relatively large area under the load-deflection curve is necessary. As the load-deflection curve of the present mount provides such area throughout the beginning of the curve, the deflection of the mount need not be as great as for commercial mounts having a relatively linear curve and, hence, the force transmitted by the present mount is less than that transmitted by such commercial mounts.

Although the embodiment shown in the drawings has a particular geometry, it will be understood that various changes in geometry may be made within the spirit of the invention. Such changes in geometry, and changes in relative sizes of elements, and other modifications may be made to suit the present mounting to different compounds of natural or synthetic rubber, to different hydraulic mediums and to different loading values.

Although not shown in the illustrated embodiment, it would be helpful to incorporate means for injecting the hydraulic medium into the chambers 49U, 49L after the mounting is assembled.

Although a particular mount will obviously be designed with certain loads, vibrations and shocks in mind, it is conceivable that in use a mount may be subjected to unanticipated conditions or it may be used beyond the intended useful life span of its resilient material. Should this occur the resilient material may rupture or one of the bonds between the resilient material and the base plate 11 and the core 23 may let go. Nevertheless, the load will not separate from the base and fly into space as the base plate 11 is imprisoned upon the load spool 13.

While there has been described what at present is considered a preferred embodiment of the present invention, it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A vibration mounting comprising a base plate pierced by a central opening; a load spool, including a pair of load plates parallel to, spaced from, and on opposite sides of, said base plate, and a core joining and normal to, said load plates; said core being disposed coaxially within the said opening in the base plate; an elastic member of resilient material interposed between the base plate and the load spool and secured to the marginal edge of the central opening in the base plate, said elastic member being generally tubular in shape and including two tubular spring elements disposed respectively on opposite sides of said base plate and coaxial with, of larger diameter than, and encircling, the core; said elastic member also including two flange-like annular webs extending inwardly from the nonadjacent ends of the spring elements, the inner marginal edges of said webs being secured to the core proximate to the load plates respectively; said elastic member also including a flange-like annular spring collar extending inwardly from the adjacent ends of said spring elements, its inner marginal surface terminating in a tubular throttling slide of permeable material acting as a throttling orifice, said throttling slide being slidably positioned about said core; there being thus formed two annular hydraulic chambers intermediate said webs and respectively on opposite sides of said spring collar, said chambers intercommunicating through the said throttling orifice; and a hydraulic medium within said hydraulic chambers.

2. A vibration mounting as set forth in claim 1, wherein the spring elements have a length-to-width ratio of at least two to one and they compress longitudinally as a column under relatively slight axial thrusts and collapse into flexure under axial thrusts of greater force and they are so contoured as to determine the direction in which said collapse takes place.

3. A vibration mounting as set forth in claim 1, wherein the spring elements are adapted to compress longitudinally as a column under relatively slight axial thrusts and to collapse inwardly into flexure under axial thrusts of greater force; and the interior configuration of each of the hydraulic chambers is such that deformation of the elastic member, when the mounting is subjected to substantially maximum axial deflection, substantially fills said chamber and forces the hydraulic medium through the throttling orifice means into the other chamber.

4. A vibration mounting as set forth in claim 1, wherein the elastic member also includes annular flanges extending outwardly from the ends of the spring elements so as to form circumferential channels about said spring elements; and auxiliary spring elements made up of tubular bands of resilient flexible material placed about the spring elements aforesaid and into said channels and operating with said spring elements as vibration isolating spring means.

5. A vibration mounting as set forth in claim 1, wherein the elastic member also includes annular flanges extending outwardly from the end portions of the spring elements and so positioned that the inner surface of each spring element has a greater longitudinal dimension than the outer surface thereof so that each spring element will undergo longitudinal compression as a column under relatively slight axial thrusts but will collapse inwardly into flexure under axial thrusts of greater magnitude.

6. In a vibration mounting, two spring elements of rubber-like material which may undergo alternate flexure during operation of the mounting, two hydraulic chambers each of which is bounded at least partly by one of said spring elements, the interior configuration of each of the hydraulic chambers being such that the associated spring element when undergoing flexure bends into and substantially fills the entire chamber, a hydraulic medium within said chambers, restricted orifice means interconnecting said hydraulic chambers so that upon operation of the mounting which results in alternate flexure of the spring elements the hydraulic medium is substantially ejected from the hydraulic chambers alternately by the flexed spring elements bending into and substantially filling said chambers.

NORMAN E. LEE.

REFERENCES CITED

The following references are of record in the file of this patent:

UNITED STATES PATENTS

| Number | Name | Date |
|---|---|---|
| 951,175 | Brousseau | Mar. 8, 1910 |
| 1,032,454 | Wainwright | July 16, 1912 |
| 1,683,330 | Chilton | Sept. 4, 1923 |
| 2,432,050 | Thiry | Dec. 2, 1947 |

FOREIGN PATENTS

| Number | Country | Date |
|---|---|---|
| 50,180 | France | Oct. 12, 1939 |
| 385,912 | France | Apr. 2, 1908 |